(12) United States Patent
Bertolini et al.

(10) Patent No.: US 10,114,840 B2
(45) Date of Patent: Oct. 30, 2018

(54) CUSTOMER DATA SEPARATION IN A SERVICE PROVIDER SCENARIO

(75) Inventors: Marco Bertolini, Hirschberg-Lautershausen (DE); Andreas Diebold, Hockenheim (DE)

(73) Assignee: SAP SE, Walldorf (DE)

( * ) Notice: Subject to any disclaimer, the term of this patent is extended or adjusted under 35 U.S.C. 154(b) by 853 days.

(21) Appl. No.: 12/569,260

(22) Filed: Sep. 29, 2009

(65) Prior Publication Data

US 2011/0078195 A1    Mar. 31, 2011

(51) Int. Cl.
*G06F 17/30* (2006.01)
*G06F 21/60* (2013.01)

(52) U.S. Cl.
CPC ...... *G06F 17/30286* (2013.01); *G06F 21/604* (2013.01)

(58) Field of Classification Search
None
See application file for complete search history.

(56) References Cited

U.S. PATENT DOCUMENTS

| | | | |
|---|---|---|---|
| 5,560,005 A * | 9/1996 | Hoover et al. | |
| 6,240,422 B1 * | 5/2001 | Atkins et al. | 719/315 |
| 7,191,186 B1 * | 3/2007 | Pullen | |
| 2002/0161602 A1 * | 10/2002 | Dougherty et al. | 705/1 |
| 2003/0212697 A1 * | 11/2003 | Davis et al. | 707/101 |
| 2004/0199524 A1 * | 10/2004 | Rys et al. | 707/100 |
| 2004/0230903 A1 * | 11/2004 | Elza et al. | 715/513 |
| 2005/0165815 A1 * | 7/2005 | Ozzie et al. | 707/100 |
| 2006/0101100 A1 * | 5/2006 | Konidena et al. | 707/204 |
| 2007/0208769 A1 * | 9/2007 | Boehm et al. | 707/102 |
| 2007/0260971 A1 * | 11/2007 | Rivas et al. | 715/511 |
| 2008/0313613 A1 * | 12/2008 | Bierhoff et al. | 717/116 |

OTHER PUBLICATIONS

Gan et al., "Inside Microsoft SQL Server 2008: T-SQL Programming", Sep. 23, 2009, Microsoft Press.*
Muench, "Building Oracle XML Applications", Oct. 2, 2000, O'Reilly Media, Inc.*
De Francesca et al., "A general framework for XML Document Clustering", 2003.*
SAP NetWeaver 7.0 EHP1 [online]. SAP, Aug. 28, 2009 [retrieved on Aug. 28, 2009]. Retrieved from the Internet: <URL: http://help.sap.com/saphelp_nw70ehp1/helpdata/en/8d/933d3c3a926614e10000000a11402f/ frameset.htm>, 27 pages.

* cited by examiner

*Primary Examiner* — Rehana Perveen
*Assistant Examiner* — Huen Wong
(74) *Attorney, Agent, or Firm* — Fish & Richardson P.C.

(57) ABSTRACT

Data separation for various customers is provided in an enterprise environment. Managing data associated with customers can involve assigning a customer attribute to customer records comprising a group of objects or assigning a group of objects to customer records. Each object in the group of objects can reference a customer attribute that can identify one of the customer records for one of the customers. Access to each of the customer records to data for each object that is assigned to the customer record can be authorized by referencing the customer attribute, in which the access is authorized to be performed by referencing the customer attribute. The group of objects for the customer records can be managed and stored in a database. A system manager can view, edit, or create data for customer records, while each customer may only have access to view, edit, or create data for their own objects.

13 Claims, 5 Drawing Sheets

CUSTOMER DATA SEPARATION IN A SERVICE PROVIDER SCENARIO

TECHNICAL FIELD

This document relates to enterprise support, such as for managing customer-related data.

BACKGROUND

A number of clients can use a multi-client system, such as an application service provider (ASP), to obtain access to the resources and features of the system while sharing similar platform and/or interface. The clients may obtain data and solutions from the system, and may be able to save costs and administration overhead by using the system. Costs may not only be saved by sharing hardware and/or software resources, multiple clients also use the same application solution, including for administration and support.

SUMMARY

In a first aspect, a computer-implemented method for managing and separating data for customers includes assigning a group of objects to a plurality of customer records, where each object in the group of objects references a customer attribute that identifies the customer records of one of the customers. The method includes authorizing access by each of the customer records to data for each object that is assigned to the customer record by referencing the customer attribute. The access is authorized to be performed by referencing the customer attribute. The method involves managing the group of objects for the plurality of customer records. The group of objects and the customer attributes are stored in a database.

Implementations can include any or all of the following features. The objects can be associated with systems, documents, issue messages, projects, and/or solutions. The assigning in the method can involve inherently assigning at least one object to the customer records of one of the customers based on a project or a solution associated with the customer. The method can include simultaneously accessing data for all of the customers in a graphical user interface. The method can include creating a new object associated with one of the customers, and assigning the new object to one of the customer records, in which the new object can reference a customer attribute that identifies the customer record. The method can involve organizing the group of objects in the database according to the customer attributes, in which the organizing may include indexing the group of objects according to the customer attributes. The method can include filtering the group of objects according to the customer attributes. The method may involve creating a new object that references a management attribute that permits data for the new object to be visible to two or more of the customers and uneditable to the two or more customers. Each customer attribute may be unique to one of the customer records. The method can involve storing the group of objects in an object list, and/or filtering the objects in the object list according to the customer attributes. The customer attributes may involve key fields. When two or more customers share a same object name, the method can involve assigning the group of objects to the plurality of customer records with each object in the group of objects referencing a customer attribute that uniquely identifies the customer records for each of the customers. The method can include accessing data for all of the customers in a graphical user interface. The method can be implemented using a computer program product tangibly embodied in a computer-readable storage medium and can include instructions that when executed by a processor perform the method.

In another aspect, a computer-implemented method for managing data associated with a plurality of customers involves assigning a group of objects to a plurality of customer records. The objects in the group of objects include parent objects and node objects. Each of the parent objects references a customer attribute that identifies the customer records of one of the customers. The node objects are hierarchically linked to the parent objects. The method involves authorizing access by each of the customer records to data for each parent object that is assigned to the customer record by referencing the customer attribute for the parent object. The access to the parent object is authorized to be performed by referencing the customer attribute. The method involves authorizing access by each of the customer records to data for each node object that is linked to one of the parent objects by referencing one or more node objects that are linked to the parent object. The access for the node object is authorized to be performed by referencing the parent object. The method includes managing the group of objects for the plurality of customer records. The group of objects and the customer attributes are stored in a database.

Implementations can include any or all of the following features. Each of the node objects can be directly or indirectly linked to one of the parent objects. Each of the node objects can reference the customer attribute of the linked parent object to authorize access for the customer record identified by the customer attribute. The assigning of at least one of the parent objects in the group of objects can involve inherently assigning at least one of the parent objects to the customer records of a customer based on a project or a solution associated with the customer. The computer-implemented method can include using the customer attribute for each parent object to identify the customer records of one of the customers to associate with each node object. The computer-implemented method can include authorizing access to edit the data for the parent and node objects. The computer-implemented method can involve assigning the customer attribute for each parent object based on a solution or a project for one of the customers. The computer-implemented method can involve obtaining access to a management attribute in the database that permits data for the parent and node objects to be visible to two or more of the customers and uneditable to the two or more customers. A computer program product can be tangibly embodied in a computer-readable storage medium and can include instructions that when executed by a processor perform the computer-implemented method.

In another aspect, a computer program product tangibly embodied in a computer-readable storage medium and including instructions that when executed by a processor perform a method for managing data associated with a plurality of customers. The method includes assigning a group of objects to a plurality of customer records. Each object in the group of objects references a customer attribute that identifies one of the customer records. The method can include authorizing access by each of the customer records to data for each object that is assigned to the customer record by referencing the customer attribute. The access is authorized to be performed by referencing the customer attribute. The method can involve managing the group of objects for the plurality of customer records. The group of objects and the customer attributes are stored in a database.

Implementations can include any or all of the following features. The computer program product can include instructions for simultaneously accessing data for all of the customers in a graphical user interface. The computer program product can include instructions for creating a new object associated with one of the customers, and assigning the new object to one of the customer records. The new object can reference a customer attribute that identifies the customer record. The computer program product can include instructions involving creating a new object that references a management attribute that permits data for the new object to be visible to two or more of the customers and uneditable to the two or more of customers. The instructions for the assigning of at least one of the objects in the group of objects can involve inherently assigning at least one of the objects to the customer records of a customer based on a project or a solution associated with the customer.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
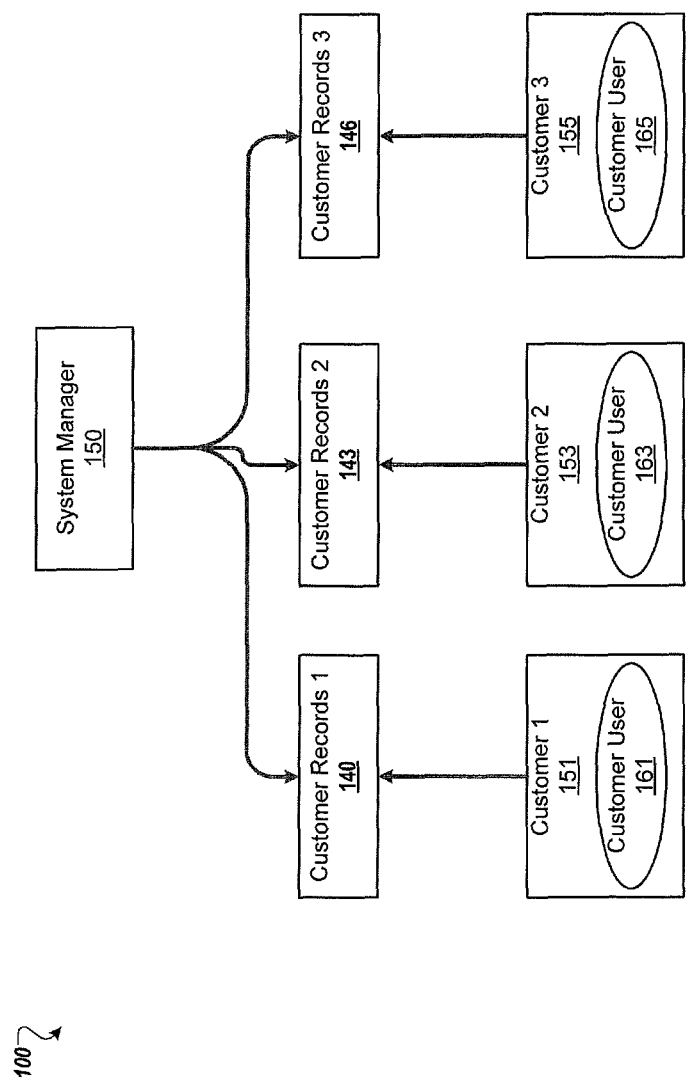
FIG. 1A is a block diagram illustrating an exemplary customer management system.

FIG. 1A is a block diagram illustrating an exemplary customer management system 100. A system manager 150 can access, manage, and control a customer management system 100, where the system 100 can have customer data separation. The system 100 has customer records 140, 143, 146, where each of the customer records are associated with a customer 151, 153, 155, respectively. Each customer 151, 153, 155 can have one or more customer users 161, 163, 165, in which the customer user 161, 163, 165 may be a primary contact, agent, and/or user of the customer management system 100 in relation to the customer's own customer records 140, 143, 146.

In some implementations, each customer user can access and create objects and data with respect to their own customer records, and not have access to the customer records of other customers. The system manager has access to all customer records for all customers, and can create and modify data associated with any of the customer records. The system manager can also create objects and data to present to one or more of the customers.

Figure 1B:
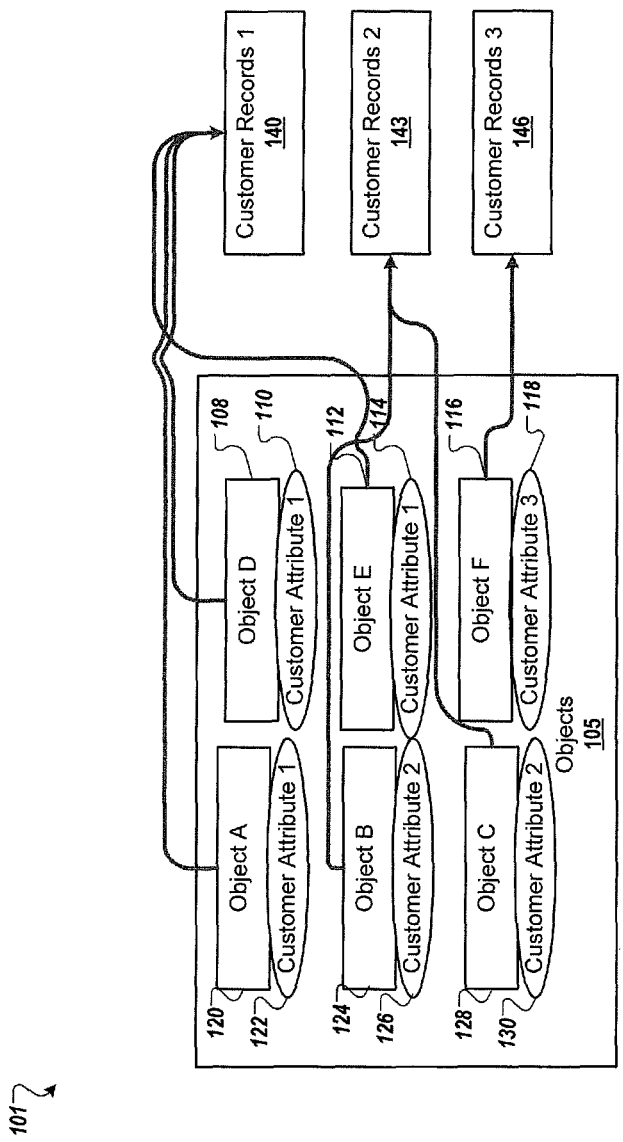
FIG. 1B is a block diagram illustrating an exemplary customer management system with customer data separation.

FIG. 1B is a block diagram illustrating an exemplary customer management system 101 with customer data separation. In some implementations, the system 101 can include an enterprise support service system for multiple customers for the management of information technology (IT) applications over the life cycle of the applications. The system 101 in FIG. 1B represents another illustration of the system 100 of FIG. 1A. The system can host and provide IT services to customers, including business processes and solutions. Customers can obtain software, custom development, and software solutions from the system 101, while running their IT applications in a secure and stable environment. Various implementations of the system 101 can allow a system manager to view, edit, create, and maintain customer data for multiple customers, while customers may only have access to their own data and solutions in the system 101. The system 101 can use customer attributes referenced by objects to separate, filter, and/or organize data for the various customers.

The system 101 can have multiple customer records 140, 143, 146 for each customer, where the customer records can represent and/or include business applications and data, data for customer support records, sales, marketing, technical, workflow, business solutions, personnel, and financial data, among others. Each customer referenced in the system 101 may have a set of customer records 140, 143, 146, or more or fewer records in some implementations. In some implementations, a group of objects 105 represents the customer records, in which each object 120, 124, 128, 108, 112, 116 in the group of objects 105 references a customer attribute 122, 126, 130, 110, 114, 118 that is used to identify one of the customer records 140, 143, 146. The objects can be or can represent, for example, documents, systems, servers, issue messages, projects, and solutions, among others. In some implementations, the system manager can create and/or maintain objects and object types for the system 101, while the customers can create and/or maintain their own objects and not object types.

In the group of objects 105, Object A 120 references a customer attribute 122 to assign Object A 120 to Customer Records 140. Object D 108 and Object E 112 references customer attributes 110, 114 to assign Objects D 108 and Object E 112 to Customer Records 140. Hence, Customer Records 140 can have objects 120, 108, 112 assigned to the Customer Records 140 by the customer attributes 122, 110, 114, respectively. Similarly, Object B 124 and Object C 128 references customer attributes 126, 130, respectively, to assign Object B 124 and Object C 128 to Customer Records 143. Object F 116 references customer attribute 118 that assigns Object F 116 to Customer Records 146.

In some implementations, the reference between the object and the customer attribute may be a link between the object and the data attribute. In other implementations, the customer attribute may be part of the data of the object, data within a data field of the object, a key or key field, or a parameter. In some implementations, the data field may be data that is appended to the object and/or metadata. The objects and/or metadata may reside in a database for the system 101. In some implementations, the customer attributes may reside in or be linked to one or more tables with customer data. The tables with the customer data may reside in a database, and may include customer identifying information. The tables may be index tables, which in some implementations, may link the customer data in the database to various customers. For example, some implementations, the customer data may include installation codes for software for various customers, customer identification numbers and characters, customer usage of software, server names for customers, or a solution or project that has or will be solved for the customer. The customer attributes can be unique for customers, so that each customer can be uniquely identified by the customer attributes. Data between various customers (and customer records) in the system can be separated, organized, and managed separately from other the data of other customers. In some implementations, the system can provide customer attributes to uniquely identify objects that may have the same names. For example, some customer servers may accidentally or inadvertently have the same server names, and these servers can be for different customers in some situations.

Access to each of the customer objects, for purposes of editing or deleting or adding data for each object that is assigned to the customer, can be authorized by referencing the customer attribute. The access is authorized to be performed by the act of referencing the customer attribute. In some implementations, for example, a customer can be authorized to obtain access to Customer Records 140, which includes Object A 120, Object D 108, Object E 112. In obtaining access to the Customer Record 140, the customer can view, edit, and modify the customer's own data and objects, while other customers may not be permitted to access the customer's data. The customer may not have access to data from another one of the customer records.

In some implementations, a customer attribute can be referenced by objects such that customers are allowed to view data along with one or more other customers. For example, if the system manager permits two or more customers to view data managed and/or created by the system manager, then the two or more customers using the system 101 may be able to view that data along with other customers when permitted. Even though a customer may be able to view that data with another customer, customers may not be allowed to edit or modify that data. For example, data can be presented for two or more of the customers in a graphical user interface, in which the data presented to the two or more customers is uneditable by the customers. The data can be edited by the system manager. In some implementations, the system 101 can filter and/or separate the data that is shown between customers based on the customer attributes that are referenced by the objects. So the system 101 can have management control over all customer data to provide selected data to selected customers, if desired.

In some implementations, customers can maintain solution information for the system 101, including software solutions and core business processes. The customer may be responsible for documenting any projects, implementations, or project updates for their own services and solutions. In some implementations, customers can access a reduced scope of the system functionality to only have access to their own data.

The system manager may use the system 101 to design information technology solutions for customers, and deliver these services to the customers. The system manager can manage the group of objects for the customer records. The system manager may assess, view, create, and edit data for multiple customers without switching or logging on to individual customer accounts. The group of objects and the customer attributes can be stored in a client-independent database, such as a knowledge warehouse. The database can store a group of objects in an object list, and be used by the system 101 in filtering the objects in the object list according to the customer attributes. The system manager also may use the system 101 to generate reporting for data stored for the various applications, projects, documents, and solutions. The reports can be generated in a way to ensure the data privacy of every customer.

In some implementations, a new object can be created that references a management attribute that permits data for an object to be both visible and uneditable to the customers. In other implementations, a customer attribute can be unique to one of the customer records, and the management attribute can be used with system as well to present data to multiple customers from the system manager. For example, the system 101 may have a display-only feature in a graphical user interface for when a customer wants to view data created by the system manager in which the system manager also permits other customers to view the data.

Some implementations may have system data that may reside at the customer site. In some of these implementations, a name space protection feature may be used by a non-hosting system to manage this data. The name space protection feature may be used, for example, when the non-hosting system at the customer's site can have a unique identifier with the system 101 so that the data for the customer can be separated from other customers when used on the system 101, and so that data is not overwritten by mistake if there are similar host and/or customer names. If more than one of the customers have the same server name, then a unique identifier can be used to separate customer data. In some implementations the unique identifier may be a key field associated with each object for the customer.

In some implementations, the system manager can use the system 101 to create an object for a customer that can be directly assigned to the customer via referencing a customer attribute for the object. The system 101 can also have objects that are created where the customer attributes are inherited and assigned based on a project or solution for a customer. For example, if a document is created then the new document can inherit the customer attribute from the project or solution. In some of these implementations, the assignment of the customer attribute for a customer is automatically performed by the system 101 based on the context of the project or solution for a customer when the object is created. In another example, the system 101 can have an "edit mode" of functionality, where information for a customer is either derived from a parent object context (e.g., a current project or a current solutions), or the system manager can directly assign a specific customer (e.g., in an system landscape management tool (SMSY) database) to the object.

In some implementations, the customer attributes are used for filtering object lists for multiple customers where the object lists can be stored in an explicit customer context. The explicit customer context can refer to a context for the data that can be stored in a database as a parameter that the system manager can use on the system 101 across all data for customers. If the system manager chooses to see the objects of all customers in the object lists, the system 101 can ensure customer separation of data. When the system manager navigates to a certain customer's object (e.g., a project) from the object list to edit the object, an editor for the system 101 can set an implicit customer context to the customer attribute of the chosen object. The implicit customer context may refer to a context for data when assessing an individual customer session. If the system manager wants to open a second session then the system manager can work in another implicit customer context. In some implementations, the explicit customer context may be used only for displaying overview screens and lists and/or displaying data of all customers or of a selected customer.

Figure 2:
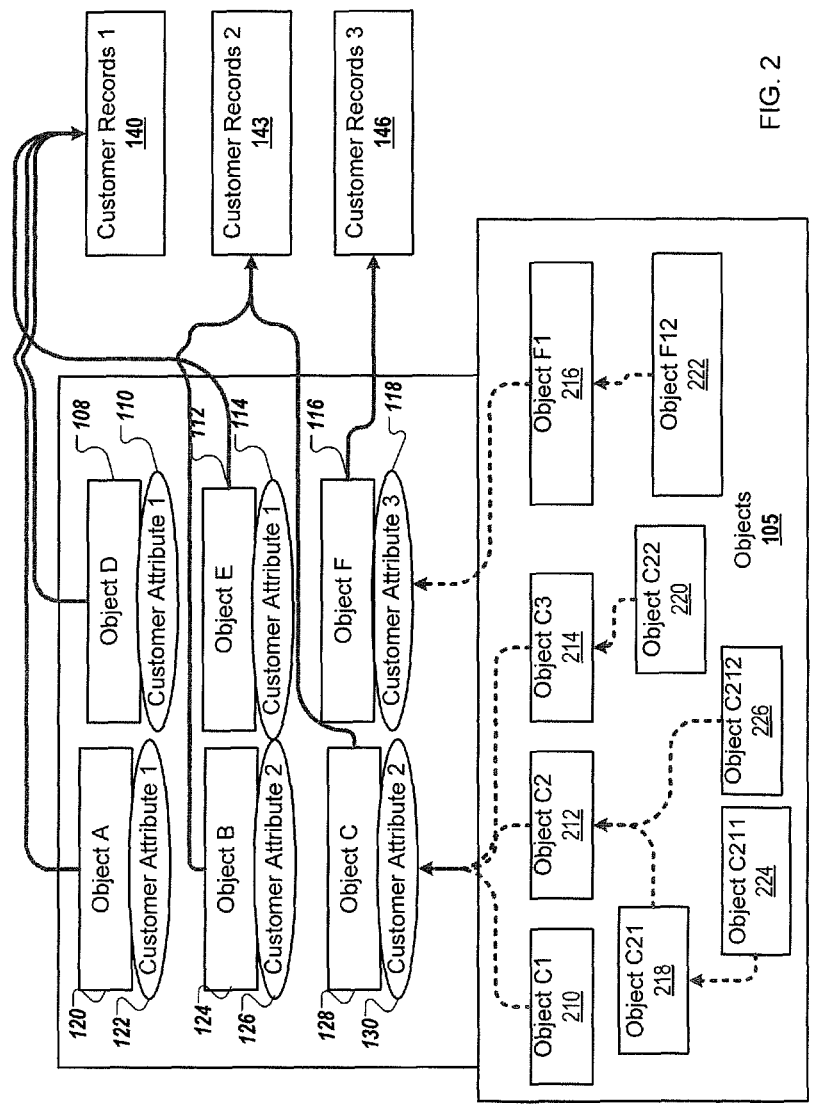
FIG. 2 is a block diagram illustrating an exemplary customer management system with customer data separation in a hierarchical framework.

FIG. 2 is a block diagram illustrating an exemplary customer management system 200 with customer data separation in a hierarchical framework, where data can be assigned to customer records directly or hierarchically. Features bearing the same reference numbers can be identical or similar to those described above. In the group of objects 105, Object A 120 references a customer attribute 122 to assign Object A 120 to Customer Records 140. Object D 108 and Object E 112 references customer attributes 110, 114 to assign Objects D 108 and Object E 112 to Customer Records 140. Hence, Customer Records 140 can have objects 120, 108, 112 assigned to the Customer Records 140 by the customer attributes 122, 110, 114, respectively. Similarly, Object B 124 and Object C 128 references customer attributes 126, 130, respectively, to assign Object B 124 and Object C 128 to Customer Records 143. Object F 116 references customer attribute 118 that assigns Object F 116 to Customer Records 146.

The group of objects 105 can include parent objects and node objects. For example, Object C 128 is a parent object to node objects Object C1 210, Object C2 212, Object C3 214, Object C21 218, Object C211 224, Object C212 226, and Object C22 220. Object F 116 is a parent node to Object F1 216 and Object F12 222. Down the hierarchy, Object C22 220 is a node object of Object C3 214. Object C21 218, Object C211 224, and Object C212 226 are node objects of Object C2 212. Object C22 220 is a node object of Object C3 214, and Object F12 222 is a node object of Object F1 216.

In some implementations, data can be assigned to a customer directly or hierarchically so that data can be protected against unauthorized viewing by customers that do not have or own the data. In an hierarchical assignment, only the parent objects are assigned to the customer, and the node objects from the parent objects are assigned to the same customer without the need of explicitly storing the assignment at every node object. Data protection, for example, may be provided at least because the node objects may not be accessed without first accessing the corresponding parent objects in the hierarchy. In some implementations, the node objects of a parent object can inherit an assignment to a customer based on the assignment of the parent object to the customer. In one example, this may be the case when a node object has multiple parent nodes belonging to different customers. Some examples corresponding to parent objects that can carry the customer attribute directly can involve logical components, systems, solutions, projects, and documents, among others.

In some implementations, the system 200 can have a computer program product tangibly embodied in a computer-readable storage medium and comprising instructions that when executed by a processor perform a method for managing data associated with a plurality of customers. The instructions for the system 200 may involve assigning a group of objects 105 to customer records, where each of the parent objects references a customer attribute that identifies one of the customer records, and the parent objects (e.g., Object F 116) and the node objects (e.g., Object F1 216, Object F12 222) are hierarchically linked.

The system 200 can authorize access to each of the customer records 140, 143, 146 to data for each parent object that is assigned to the customer record by referencing the customer attribute for the parent object. The access to the parent object can be authorized to be performed by referencing the customer attribute. The system 200 also authorizes access by each of the customer records to data for each node object (e.g., Object F1 216, Object F12 222) that is linked to one of the parent objects (Object F 116) by referencing one or more node objects (e.g., Object F1 216) that are linked to the parent object (Object F 116), in which the access for the node object (e.g., Object F1 216) is authorized to be performed by referencing the parent object. The group of objects 105 and the customer attributes 122, 126, 130, 110, 114, 118 can be stored in a database. Some features of the system 200 in FIG. 2 may be similar to the features of the system 100, 101 in FIGS. 1A and 1B.

In some implementations, each of the node objects can be directly or indirectly linked to one of the parent objects. The customer attribute for each parent object can be used to identify one of the customer records associated with each node object. In some cases, the customer attribute for each parent object can be assigned to one of the customer records based on a context of a solution or a project for the customer. The system 200 may also obtain access to a management attribute in the database that, if the system manager permits, can allow data for the parent and node objects to be both visible and uneditable to the customers. Hence, at least in some cases, the system 200 may allow two or more customers to see at least some common data for objects in a graphical user interface without permitting the customers to modify the data. A system manager using the system 200 can be authorized to fully view, edit, and create data for the parent and node objects. In some implementations, the system 200 authorizes access to the system manager to view and edit the data for the parent and node objects when access is obtained to the management or customer attributes, and/or when a new object is created.

In some implementations, if a parent object is not associated with a customer attribute (e.g., when the parent object is created), the parent object can inherit the customer attribute that identifies a customer based on a context of a solution or project for a customer. For example, a document can be created for a solution or project for a customer, and the document can inherit a customer attribute identifying that customer based on being created for the solution or project associated with the customer. The node objects of that parent object can be identified with that customer based on the customer attribute of the parent object identifying the customer.

Figure 3:
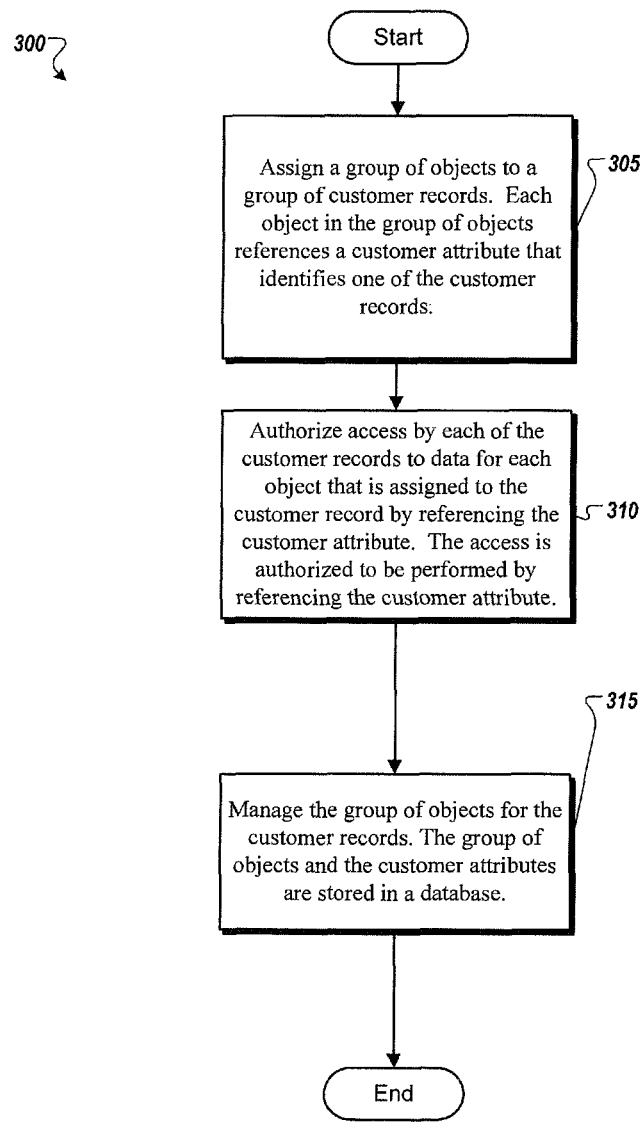
FIG. 3 is a flow chart of exemplary operations that can perform customer management and data separation.

FIG. 3 is a flow chart of exemplary operations that can perform customer management and data separation. The operations 300 can be performed by a processor that executes instructions stored in a computer-readable medium. For example, a computer device operated by an enterprise and included in system 101 and/or 200 can perform the operations 300.

A process begins at step 305 by assigning a group of objects to a group of customer records. In some implementations, each object in the group of object references a customer attribute that identifies one of the customer records. If an object exists and has not been assigned to one of the customer records, then the object can be directly assigned to the group of customer records (e.g., as described above with respect to FIG. 1B), hierarchically assigned (e.g., as described above with respect to FIG. 2), or inherently assigned based on, for example, a solution or project for a customer. This assignment can be used to migrate existing objects to the customer data separation scheme. Newly-created objects can be assigned to the customer records for a customer.

In step 310, access by each of the customer records to data for each object that is assigned to the customer record is authorized by referencing the customer attribute for each object. In some implementations, the system manager can view, edit, and create objects for various customer records while using the customer attributes for the objects to separate the data for the various customers. Each customer may be authorized to access their own data for viewing, editing, and creating data in the system, in which the referenced customer attributes for the objects can be used to identify the customer records for the customer.

In step 315, the group of objects for the customer records can be managed, for example, by the system (e.g., system 101 in FIG. 1B or system 200 in FIG. 2). The group of objects and the customer attributes can be stored in a database. The database can reside on (or be hosted by) the system for the system manager. In some implementations, the database may be distributed with some objects residing on (or hosted by) one or more customer's systems. For some of these implementations, the objects residing on the customer system may reference a customer attribute that can uniquely identify the customer's records when the objects from the customer's system interact with the database for the system for the system manager. In these implementations, customer data separation can be maintained in the system for the system manager when the database is distributed.

In some implementations, when two or more customers use the same name for an object (e.g., an accidental use of the same name for the object of each customer), there can be an assignment of the group of objects to customer records, where each object in the group of objects references a customer attribute that uniquely identifies the customer records for each of the customers. In this aspect, each customer can be uniquely identified in the system even though two or more customers may use the same object identifier (e.g., a common customer name or an object name). In some implementations, the customer attribute may be or represent a key field, and may have alphanumeric characters, for example, to uniquely identify each customer and/or the customer records associated with each of the customers.

Figure 4:
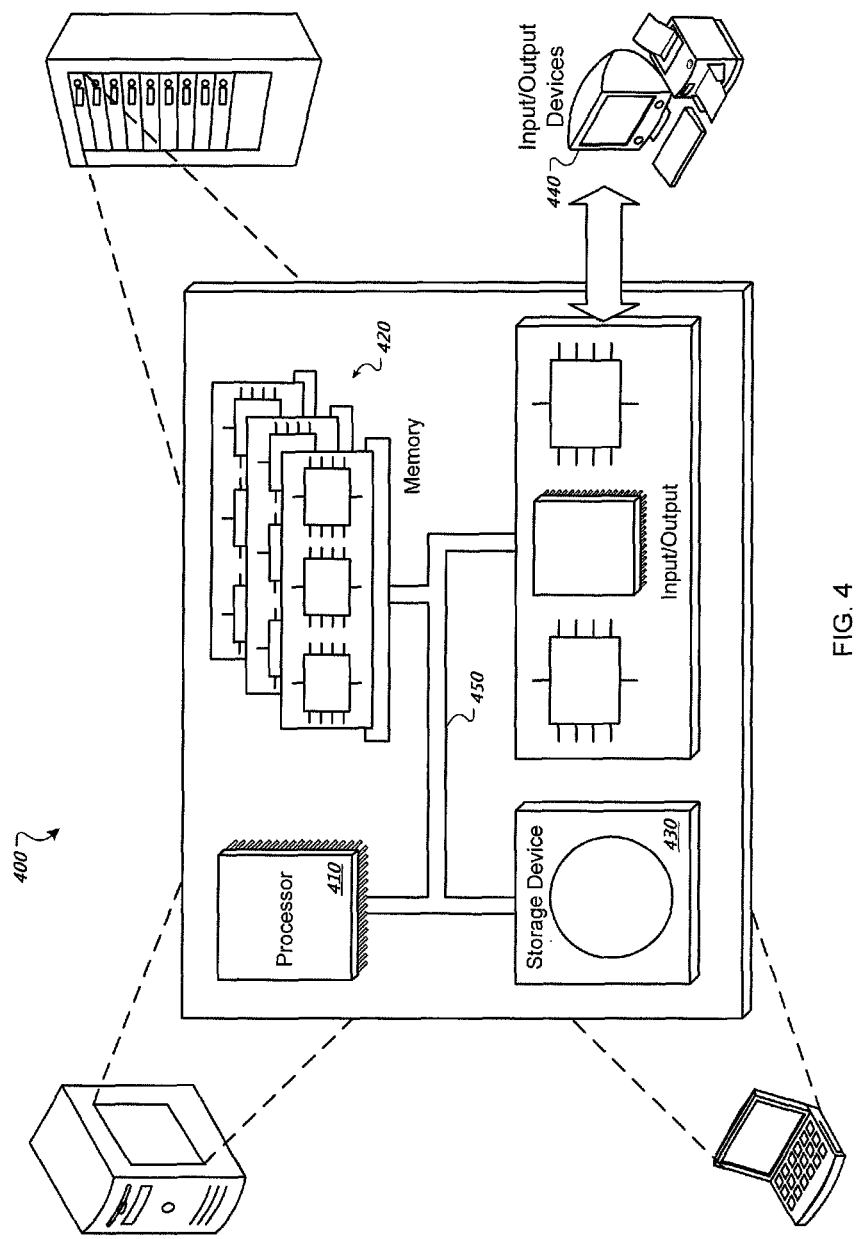
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Certain features that are described in this specification in the context of separate implementations can also be implemented in combination in a single implementation. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination. In some implementations, a method for managing data associated with multiple customers can involve assigning a customer attribute to customer records comprising a group of objects. An order of the steps of various processes may vary from what is described above. Data separation can be performed for any number of customers and customer records. Nevertheless, it will be understood that various modifications may be made without departing from the spirit and scope of this disclosure. Accordingly, other implementations are within the scope of the following claims.

What is claimed is:

1. A computer-implemented method for controlling customer access to documents, the method comprising:
    storing, by a computing system, a group of documents for a plurality of customers, wherein:
        (i) each of the documents in the group is either a parent document or a node document,
        (ii) the documents in the group include multiple parent documents and multiple node documents,
        (iii) each of the node documents is directly linked to one or more of the parent documents or are indirectly linked to one or more of the parent documents through other of the node documents, and
        (iv) the plurality of customers are associated with a plurality of customer records such that each of the customers is associated with a customer record from the plurality of customer records;
    authorizing, by the computing system, each customer in the plurality of customers to access only a respective subset of the documents from the group of documents by assigning each document in the group of documents to a respective customer record from the plurality of customer records, wherein:
        (i) the assigning of each document to the respective customer record involves including, for each of the parent documents, a reference to a customer attribute that identifies the respective customer record, the customer attribute being included in a plurality of customer attributes, and
        (ii) only the parent documents in the group of documents are assigned to the customer records such that the node documents do not include references to customer attributes;
    receiving, by the computing system, a request to access documents for a particular customer, and in response:
        (i) authorizing the particular customer to access each parent document that includes a particular customer attribute that identifies the respective customer record associated with the particular customer, wherein the computing system authorizes the access to the parent document by referencing the particular customer attribute;
        (ii) authorizing the particular customer to access each node document that is linked to each of the parent objects that include the customer attribute, wherein the computing system authorizes the access to the node document by referencing the parent document that include the particular customer attribute without first accessing the node document; and
    managing, by the computing system, the group of documents for the plurality of customer records, wherein the group of documents and the plurality of customer attributes are stored in a database.

2. The computer-implemented method of claim 1, further comprising, as a result of the computing system authorizing the particular customer to access each parent document that includes the particular customer attribute and each node document that is linked to each parent document that includes the particular customer attribute, authorizing, by the computing system, the particular customer to edit each parent document that includes the particular customer attribute and each node document that is linked to each parent document that includes the particular customer attribute.

3. The computer-implemented method of claim 1, wherein a particular one of the node documents has a plurality of parent documents that are assigned to different customers by way of the plurality of parent documents including different references to different customer attributes, further comprising:
    authorizing, by the computing system, each of the different customers to access the particular one of the node documents as a result of the particular one of the node documents having the plurality of parent documents that are assigned to the different customers.

4. The computer-implemented method of claim 1, further comprising simultaneously providing a display of data for all of the plurality of customers in a graphical user interface.

5. The computer-implemented method of claim 1, further comprising:
    organizing, by the computing system, the group of documents according to the customer attributes assigned to the parent documents, wherein the organizing comprises indexing the group of documents according to the customer attributes; and
    filtering, by the computing system, the group of documents according to the customer attributes.

6. The computer-implemented method of claim 1, wherein each customer attribute of the plurality of customer attributes assigned to the parent documents is unique to the customer record for one of the customers, and the method further comprises:
    storing the group of documents in a document list; and
    filtering the documents in the document list according to the customer attributes, wherein the customer attributes comprise key fields.

7. A non-transitory computer-readable storage medium comprising instructions that, when executed by a processor, perform a method for controlling customer access to documents, the method comprising:
    storing, by a computing system, a group of documents for a plurality of customers, wherein:
        (i) each of the documents in the group is either a parent document or a node document,
        (ii) the documents in the group include multiple parent documents and multiple node documents,
        (iii) each of the node documents is directly linked to one or more of the parent documents or are indirectly linked to one or more of the parent documents through other of the node documents, and
        (iv) the plurality of customers are associated with a plurality of customer records such that each of the customers is associated with a customer record from the plurality of customer records;

authorizing, by the computing system, each customer in the plurality of customers to access only a respective subset of the documents from the group of documents by assigning each document in the group of documents to a respective customer record from the plurality of customer records, wherein:
  (i) the assigning of each document to the respective customer record involves including, for each of the parent documents, a reference to a customer attribute that identifies the respective customer record, the customer attribute being included in a plurality of customer attributes, and
  (ii) only the parent documents in the group of documents are assigned to the customer records such that the node documents do not include references to customer attributes;
receiving, by the computing system, a request to access documents for a particular customer, and in response:
  (i) authorizing the particular customer to access each parent document that includes a particular customer attribute that identifies the respective customer record associated with the particular customer, wherein the computing system authorizes the access to the parent document by referencing the particular customer attribute;
  (ii) authorizing the particular customer to access each node document that is linked to each of the parent objects that include the customer attribute, wherein the computing system authorizes the access to the node document by referencing the parent document that include the particular customer attribute without first accessing the node document; and
managing, by the computing system, the group of documents for the plurality of customer records, wherein the group of documents and the plurality of customer attributes are stored in a database.

8. The computer-readable storage medium of claim 7, wherein the method further comprises, as a result of the computing system authorizing the particular customer to access each parent document that includes the particular customer attribute and each node document that is linked to each parent document that includes the particular customer attribute, authorizing, by the computing system, the particular customer to edit each parent document that includes the particular customer attribute and each node document that is linked to each parent document that includes the particular customer attribute.

9. The computer-readable storage medium of claim 7, wherein a particular one of the node documents has a plurality of parent documents that are assigned to different customers by way of the plurality of parent documents including different references to different customer attributes, further comprising:
  authorizing, by the computing system, each of the different customers to access the particular one of the node documents as a result of the particular one of the node documents having the plurality of parent documents that are assigned to the different customers.

10. The computer-readable storage medium of claim 7, wherein the method further comprises simultaneously providing a display of data for all of the plurality of customers in a graphical user interface.

11. The computer-readable storage medium of claim 7, wherein the method further comprises:
  organizing, by the computing system, the group of documents according to the customer attributes assigned to the parent documents, wherein the organizing comprises indexing the group of documents according to the customer attributes; and
  filtering, by the computing system, the group of documents according to the customer attributes.

12. The computer-readable storage medium of claim 7, wherein each customer attribute of the plurality of customer attributes assigned to the parent documents is unique to the customer record for one of the customers, and the method further comprises:
  storing the group of documents in a document list; and
  filtering the documents in the document list according to the customer attributes, wherein the customer attributes comprise key fields.

13. The computer-implemented method of claim 3, wherein none of the plurality of parent documents are in a parent and child relationship with each other.

* * * * *